US012486475B2

(12) United States Patent
Pereira et al.

(10) Patent No.: US 12,486,475 B2
(45) Date of Patent: Dec. 2, 2025

(54) COMPOSITION FOR SURFACE CARE APPLICATION

(71) Applicant: RHODIA BRASIL S.A., São Paulo (BR)

(72) Inventors: Livia Pereira, Paulínia (BR); Sergio Martins, Campinas (BR)

(73) Assignee: RHODIA BRASIL S.A., São Paulo (BR)

( * ) Notice: Subject to any disclaimer, the term of this patent is extended or adjusted under 35 U.S.C. 154(b) by 447 days.

(21) Appl. No.: 17/771,300

(22) PCT Filed: Oct. 19, 2020

(86) PCT No.: PCT/IB2020/059798

§ 371 (c)(1), (2) Date: Apr. 22, 2022

(87) PCT Pub. No.: WO2021/079247

PCT Pub. Date: Apr. 29, 2021

(65) Prior Publication Data

US 2022/0380702 A1 Dec. 1, 2022

(30) Foreign Application Priority Data

Oct. 23, 2019 (WO) .................. PCT/IB2019/059037

(51) Int. Cl.
*C11D 3/00* (2006.01)
*C11D 1/22* (2006.01)
(Continued)

(52) U.S. Cl.
CPC .............. *C11D 3/2096* (2013.01); *C11D 1/22* (2013.01); *C11D 3/30* (2013.01); *C11D 3/43* (2013.01); *C11D 2111/14* (2024.01)

(58) Field of Classification Search
None
See application file for complete search history.

(56) References Cited

U.S. PATENT DOCUMENTS

2014/0031271 A1* 1/2014 Lourenco ............. C11D 3/2075 510/238
2014/0235878 A1* 8/2014 Rodrigues ............ C07D 317/20 549/453
2017/0002295 A1* 1/2017 Arhancet ............. C07C 323/52

FOREIGN PATENT DOCUMENTS

WO 2017064551 A1 4/2017
WO 2017137786 A1 8/2017
WO 2019188140 A1 10/2019

OTHER PUBLICATIONS

Standard ASTM D4488-95; Standard guide for testing cleaning performance of products intended for use on resilient flooring and washable walls (15 pages).

(Continued)

*Primary Examiner* — Necholus Ogden, Jr.
(74) *Attorney, Agent, or Firm* — Osha Bergman Watanabe & Burton LLP

(57) ABSTRACT

The present invention refers to a composition for cleaning application comprising a surfactant and a ketal of formula (I) wherein R1 and R2, independently from one another, are selected in the group consisting of: a linear or branched C1-C12 alkyl, a C4-C12 cycloalkyl or an aryl. R3 is H, a linear or branched alkyl, a cycloalkyl or a —C(═O)R4 group, with R4 being a linear or branched C1-C4 alkyl or a C5-C6 cycloalkyl; and wherein the mass ratio between the surfactant and the ketal is between 80:20 to 20:80. The combination of the specific bio-sourced ketal and surfactant
(Continued)

APG vs 2-isobutyl-2-methyl-1,3-dioxolane-4-methanol provides a synergic effect, improving the performance of the cleaning product.

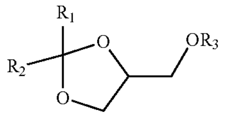

(I)

13 Claims, 3 Drawing Sheets

(51) Int. Cl.

| | |
|---|---|
| ***C11D 3/20*** | (2006.01) |
| ***C11D 3/30*** | (2006.01) |
| ***C11D 3/43*** | (2006.01) |

(56) References Cited

OTHER PUBLICATIONS

International Search Report issued in corresponding International Application No. PCT/IB2020/059798; mailed Dec. 18, 2020 (4 pages).

Written Opinion of the International Searching Authority issued in International Application No. PCT/IB2020/059798; dated Oct. 20, 2020 (6 pages).

* cited by examiner

COMPOSITION FOR SURFACE CARE APPLICATION

This application is a national stage application of PCT/IB2020/059798 filed on 19 Oct. 2020, which claims priority filed on 23 Oct. 2019 in INTERNATIONAL PROCEDURE with Nr IB2019/059037, the whole content of this application being incorporated herein by reference for all purposes.

TECHNICAL FIELD

The present invention relates to surface care applications, in particular for cleaning compositions. More specifically, the present invention focuses on compositions comprising the combination of ketals and surfactants in synergistic mass ratios, notably for providing improved cleaning compositions.

BACKGROUND OF THE INVENTION

A large variety of cleaning compositions intended for surface care applications is known in the field. Multipurpose compositions are also known, as well as cleaning compositions for wipes, windows and glass compositions, perfumed cleaners compositions, heavy degreaser compositions and kitchen/oven or bathroom compositions.

Multi-purpose cleaning agents are designed to clean several different types of washable hard surface. The benefits of multi-purpose cleaning agents are that they offer consumers a cleaning product that can be used throughout the majority of the house. For example, multi-purpose cleaning agents may be used for wiping down and cleaning work surfaces, bathroom surfaces such as floors, walls, windows, kitchen equipment, etc.

Cleaning compositions usually comprise surfactant and water. A surfactant improves wetting of the surface to be cleaned and hastens penetration of the active components. In addition, a surfactant can facilitate water rinsing and water clean-up of the substrate after removal of the soil or coating.

Surfactants are the main components in household detergent. Household detergents include laundry detergent (such as washing powder, laundry soap, laundry detergent, washing paste, and laundry tablets), home cleaning supplies (such as detergent, floor cleaner, toilet fine and clean appliances cleaning), and personal toiletries (such as shampoo, shower gel, hand liquid and cleanser).

However, some surfactants, such as dihydroxyethyl cocamine oxide, ethoxylate alcohol 9EO and ethoxylate alcohol 7EO, have some toxicity and may accumulate in the human body. Besides the impact in the environment, in a long-term use, they cause skin irritation effect and lead to some degree of damage.

The constant search for sustainable alternatives in several fields of the chemical industry led to development of alternatives that meet the three pillars of sustainability (economical, environmental and social). Such alternatives shall present competitiveness, and additionally low toxicity to humans and environment.

For example solvents such as alcohols or glycols have been used to replace surfactants, in order to reduce toxicity and odor of cleaning composition, but such replacement has a negative impact on the cleaning performance.

"Bio-sourced" solvents can be used as replacements for petroleum-sourced solvents. Few, solvents that can be provided from renewable resources are available that can meet the increasingly demanding technical requirements for cleaning compositions. Even where such solvents are available, the solvents can have various drawbacks. For example, d-limonene, which has been used as a replacement for chlorinated solvents in degreasing applications, has a strong odor, is combustible, and is classified as an irritant and sensitizer. Similarly, ethanol is a versatile solvent that is readily available from bio-based sources, but its high flammability limits its use in solvent applications. A further drawback of these solvents is that the chemical and physical properties of the solvents can only be adjusted to a limited extent.

Consequently, there is ongoing research into novel efficient solutions for surface care cleaning compositions.

Accordingly, there is a need in the art for alternative cleaning compositions that offer an advantageous combination of solubilization activity, stability under basic conditions, volatility, toxicity, environmental profile, and cost.

It would be advantageous if the cleaning compositions meet one or more customer needs, such as appropriate viscosity, low odor, good solubilization activity, low toxicity, low cost and excellent cleaning performance.

BRIEF DESCRIPTION OF THE INVENTION

The present invention refers to a composition for surface care application comprising a surfactant and a ketal of formula (I)

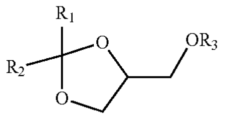

wherein $R_1$ and $R_2$, independently from one another, are selected in the group consisting of: a linear or branched $C_1$-$C_{12}$ alkyl, a $C_4$-$C_{12}$ cycloalkyl or an aryl.

$R_3$ is H, a linear or branched alkyl, a cycloalkyl or a —C(=O)$R_4$ group, with $R_4$ being a linear or branched $C_1$-$C_4$ alkyl or a $C_5$-$C_6$ cycloalkyl;

wherein the mass ratio between the surfactant and the ketal of formula I is between 80:20 to 20:80.

The combination of the specific ketal and surfactant provides a synergic effect, improving the performance of the cleaning product.

The present invention also provides the use of the above composition for cleaning hard surfaces.

It is also an object of the present invention the use of a ketal of formula I (I)

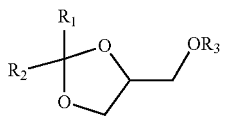

wherein

R1 and R2, independently from one another, are selected in the group consisting of: a linear or branched C1-C12 alkyl, a C4-C12 cycloalkyl or an aryl.

R3 is H, a linear or branched alkyl, a cycloalkyl or a —C(=O)R4 group, with R4 being a linear or branched C1-C4 alkyl or a C5-C6 cycloalkyl;

into a cleaning composition comprising a surfactant to replace the surfactant in a mass ratio of surfactant:ketal of 80:20 to 20:80, wherein the surfactant is selected from the group consisting of alkylpolyglycoside (APG), amine oxide, sodium dodecylbenzenesulfonate (SDBS), alcohol ethoxylate 7EO and alcohol ethoxylate 9EO.

BRIEF DESCRIPTION OF THE DRAWINGS

The advantage described above is clearer to those skilled in the art from the figures.

DETAILED DESCRIPTION OF THE INVENTION

Figure 1:
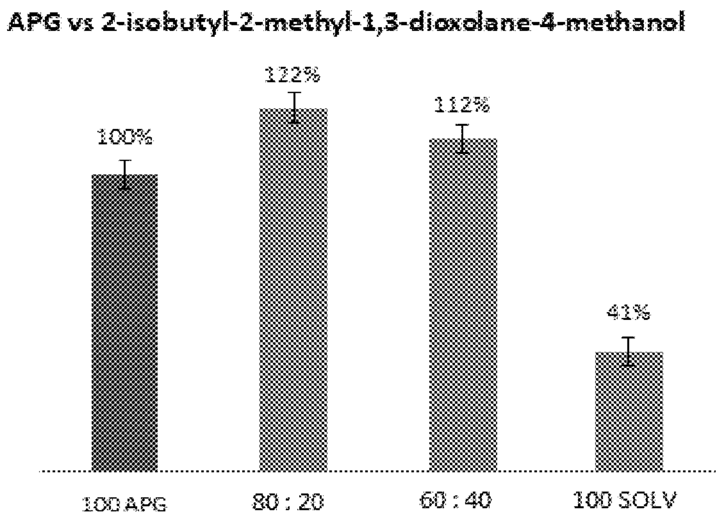
FIG. 1 shows the result of the test performed for alkylpolyglycoside and 2-isobutyl-2-methyl-1,3-dioxolane-4-methanol.

Cleaning products usually comprise water and surfactant. Most of surfactants are toxic and not environmentally friendly and, thus, it is suggested replacing part of the surfactant by a ketal which can even improve the performance of the cleaning product in view of a synergistic combination.

More specifically, the present invention discloses a composition for surface care application comprising a surfactant and a ketal of formula (I)

(I)

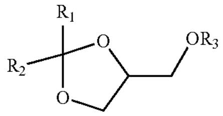

wherein

- $R_1$ and $R_2$, independently from one another, are selected in the group consisting of: a linear or branched $C_1$-$C_{12}$ alkyl, a $C_4$-$C_{12}$ cycloalkyl or an aryl.
- $R_3$ is H, a linear or branched alkyl, a cycloalkyl or a —C(═O)$R_4$ group,
- with $R_4$ being a linear or branched $C_1$-$C_4$ alkyl or a $C_5$-$C_6$ cycloalkyl; wherein the mass ratio between the surfactant and the ketal of formula I is between 80:20 to 20:80.

In a preferred embodiment, $R_1$ and $R_2$, independently from one another, are selected in the group consisting of: methyl, ethyl, isopropyl, n-propyl, isobutyl, n-butyl, test-butyl, n-pentyl, cyclopentyl, cyclohexyl or phenyl.

Advantageously, in formula I above $R_3$ is H or a —C(═O)$R_4$ group, with $R_4$ being methyl, ethyl, isopropyl, n-propyl, isobutyl, n-butyl or tert-butyl. More preferably, $R_3$ is H.

One preferred embodiment is when $R_1$ and $R_2$ are methyl and $R_3$ is H. In this case, the ketal is 2,2-dimethyl-1,3-dioxolane-4-methanol, according to the structure below:

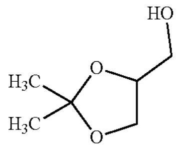

This ketal is commercially available, for example under the name Augeo® Clean Multi, Augeo® SL191 or Solketal. This ketal can be synthesized by reaction between glycerol and acetone, under well-known classical conditions.

In another embodiment, $R_1$ is methyl, $R_2$ is isobutyl and $R_3$ is H. In this case, the ketal is 2-isobutyl-2-methyl-1,3-dioxolane-4-methanol, according to the structure below:

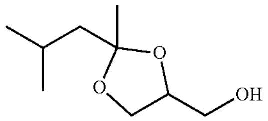

This ketal is commercially available, for example under the name Augeo® Clean Plus or Augeo® Film. This ketal can be synthesized by reaction between glycerol and methyl-isobutyl ketone under well-known classical conditions.

Preferably, $R_1$ is $CH_3$, $R_2$ is $CH_3$ or isobutyl, $R_3$ is H and the mass ratio between the surfactant and the ketal is between 80:20 to 60:40.

The compounds of formula I, when used in specific mass ratios, improve the performance in the cleaning application, have low odor and no toxicity to humans or environment. In addition, their use induces no security issues because of their high flash point.

The cleaning performance is measured according to the test described in ASTM D4488-95.

By "improve the performance", it should be understood that the cleaning performance of the composition according to the invention is improved or not significantly reduced compared to the same composition having in a mass ratio surfactant:ketal of 100:0.

By "not significantly reduce the performance", it should be understood that the cleaning performance has a reduction of up to 5% measured according to the test described in ASTM D4488-95, that is, it achieves least 95% of the performance of the same composition having a mass ratio surfactant:ketal of 100:0.

The compounds of formula I, which can come from renewable resources, has excellent combination of properties for use in surface care applications, including solubilizing activity, low flammability, non-corrosiveness, and low odor.

A wide variety of surfactants may be used in the compositions of the present invention, such as non-ionic, anionic, cationic, zwitterionic and amphoteric surfactants.

A surfactant improves wetting of the surface to be cleaned and hastens penetration of the active components. In addition, a surfactant can facilitate water rinsing and water clean-up of the substrate after removal of the soil or coating.

The appropriate non-ionic surfactants comprise alkylamine oxides, for example C8-20 alkyldimethylamine oxides, alkylphenol ethoxylates, linear and branched alcohol ethoxylates, carboxylic acid esters, alkanolamides, alkylpolyglycosides, copolymers of ethylene oxide/propylene oxide, etc. Among these surfactants, linear and secondary alcohol ethoxylates, octylphenol and nonylphenol ethoxylates, alkanolamides and alkylpolyglycosides are particularly preferred. Mixtures of two or more above surfactants can be used. All those surfactants are commercially available.

The zwitterionic/amphoteric surfactants that are useful comprise alkylaminopropionic acids, alkyliminopropionic acids, imidazoline carboxylates, alkylbetaines, sulfobetaines and sultaines. Mixtures of two or more above can be used. All those surfactants are commercially available.

The cationic surfactants that are useful comprise primary amine salts, diamine salts, quaternary ammonium salts and ethoxylated amines. Mixtures of two or more above can be used. All those surfactants are commercially available.

The anionic surfactants that are useful comprise carboxylic acid salts, alkylbenzene sulfonates, alkylbenzenesulfonic acid, secondary n-alkanesulfonates, α-olefin sulfonates, dialkyl oxydiphenylene sulfonates, sulfosuccinate esters, isethionates, linear alcohol sulfates such as alkyl sulfates, for instance sodium lauryl sulfate, and linear ethoxyalcohol sulfates, water-soluble salts of alkylbenzene sulfonates. Alkylbenzene sulfonates are recommended, especially water-soluble salts of alkylbenzene sulfonates. Mixtures of two or more above can be used. All those surfactants are commercially available.

In a preferred embodiment, the surfactant is selected from the group consisting of alkylpolyglycoside (APG), amine oxide, sodium dodecylbenzenesulfonate (SDBS), alcohol ethoxylate 7EO and alcohol ethoxylate 9EO.

In a more preferred embodiment, the surfactant is selected from the group consisting of alkylpolyglycoside (APG), sodium dodecylbenzenesulfonate (SDBS), and alcohol ethoxylate 9EO.

In the most preferred embodiment, the surfactant is sodium dodecylbenzenesulfonate (SDBS), the ketal is 2-isobutyl-2-methyl-1,3-dioxolane-4-methanol and the mass ratio between the surfactant and the ketal is 60:40 to 40:60, preferably 40:60.

It has been found that the composition comprising the surfactant and the ketal of formula I described above improves cleaning performance in cleaning compositions for surface care, particularly useful for cleaning soiled and oily surfaces.

The use according to the invention allows promoting the cleaning performances of surface care cleaning composition, notably when compared to a surface care cleaning composition containing only a ketal of the formula I described above or only a surfactant instead of the combination of them.

In another embodiment, the composition of the present invention further comprises water.

In a different embodiment, the composition of the present invention further comprises alkalinizing agent.

Advantageously, the composition of the present invention comprises surfactant, a ketal of formula I, alkalinizing agent and water.

Preferably, the alkalinizing agent is selected from the group consisting of monoethanolamine (MEA), potassium hydroxide, sodium hydroxide, triethanolamine (TEA) and methyl isopropylamine (MIPA).

In a preferred embodiment of the invention, the surface care cleaning composition comprises 0.5 to 2% by weight of the combination of surfactant and ketal of formula I, 0.5 to 2% by weight of alkalinizing agent and 96 to 99% by weight of water.

In the most preferred embodiment, the surface care cleaning composition comprises 1% by weight of the combination of surfactant and ketal of formula I, 1% by weight of alkalinizing agent and 98% by weight of water.

The present invention also relates to the use of the cleaning composition for cleaning surfaces, especially hard surfaces.

According to the invention, the cleaning composition is directed to surface care applications, including hard surface, soft surface and general cleaning applications. Non-limiting examples of hard surface cleaning compositions are dish washing composition, glass cleaning composition, oven cleaning composition, concrete cleaning composition, foam cleaning composition and industrial cleaning composition, multipurpose composition, perfumed cleaner composition, kitchen cleaners, degreaser, heavy duty compositions and bathroom cleaners compositions.

Soft surface cleaning compositions are also targeted, such as laundry composition for leather or fabrics made of synthetic or natural fibers. Fabrics include woven or non-woven fabrics, for example carpet or textile. Synthetic fibers include polyester, polyamide, and others; natural fibres include cotton, silk, wool and others. This cleaning composition is used for removing of substances like paints, graffiti, mold, inks, sealants, adhesives, mastic, photoresist, wax, polishes, asphalt, paraffin, sap, oil, grease or a combination thereof.

In another specific embodiment, the cleaning composition is a hard surface cleaner having a general composition as is known in the art, and which can be formulated for industrial, institutional, office or, home use. These can be formulated as, for example, general purposes hard surface cleaners, toilet cleaners, shower/bath/tile cleaners, disinfectants, soap scum removers, mildew removers, glass/mirror cleaners, or stain removers. Many of these cleaners are formulated as dilute solutions or emulsions, and many are applied by spraying. In hard surface cleaning compositions, the cleaning blend of the present invention can perform any or all of several functions, such as (1) soil dissolution and/or removal; (2) compatibilization of ingredients, particularly sparingly water-insoluble ingredients into water; (3) formation of a cosolvent mixture in which one or more other ingredients are dissolved or dispersed, (4) elimination or reduction of surfactants and/or organic solvents or others.

The composition of the present invention is preferably used for a general cleaning including multipurpose, perfumed cleaner, kitchen cleaner, oven cleaner, degreaser, heavy duty, bathroom cleaner.

When used with cosolvents or other components, the cleaning compositions can be provided as a concentrate. The concentrates are usually diluted in water for use as a working water-based cleaning composition.

The cleaning compositions can be in the form of a solid, a gel, a liquid, an emulsion. A single composition can have more than one use, for example a single composition can be used for cleaning both hard surfaces and soft surfaces.

The cleaning compositions can alternatively be formulated in other forms useful for removal, for example gels, wipes, aerosols, and the like. The removal compositions can be formulated in gel form by the addition of an effective amount of a gelling agent such as fumed silica, organic gums, polymers, copolymers, paraffin wax, bentonite clay, and cellulose ethers such as methyl cellulose and hydroxypropyl methyl cellulose commercially available as METHO- CEL® cellulose ethers, from Dow Chemical. Wipes are generally a natural or synthetic fabric piece impregnated with the gel or liquid removal composition. When used as an aerosol, the cleaning compositions are formulated under pressure with a propellant as is known in the art.

Non-limiting examples of hard surfaces that may be treated using the compositions of the present invention are surfaces of refractory materials such as glazed and unglazed tiles, bricks, porcelain, ceramic and stone, marble, granite, stones and other surfaces; glass, metals, plastics, for example polyester, vinyl, glass fibre, Formica®, Corian® and other known hard surfaces used in cupboards and work surfaces and also wall and floor surfaces.

The compositions of the present invention also find a use in the cleaning of metallic surfaces outside and inside kitchen and bathroom appliances, for example the metal surfaces of kitchen appliances, including, without being limited thereto, polished, chromium-plated, burnished surfaces or mat or brushed-metal surfaces as found on kitchen work surfaces, electrical appliance cases, the surfaces of appliances including external appliance surfaces such as doors, and also internal surfaces such as the internal spaces of dishwashers, ovens and cooking hobs.

The compositions of the present invention afford the cleaning and reduction of stains, tarnishing or other discolorations of metal, such as those caused by the accumulation of soiling and grease or the oxidation of treated metal surfaces. Non-limiting examples of metals that may be mentioned include aluminium, copper, steel, stainless steel, brass and metal alloys that may comprise one or more of the above-mentioned metals, and also non-metallic substrates with a metallic or metallized surface.

The compositions of the present invention, when used in laundry detergency, afford removing stains and avoiding soils and dirt re-deposition without damaging the textile. The fibres of textiles used can include one or more of the materials listed: polyester, aramid, cotton, acrylic, wool, nylon, silk, Lycra®, polyurethane.

A method of cleaning, for example, removing a substance such as a coating, soils and/or stains from a substrate comprises contacting the substance with a composition comprising the composition of the present invention, said method comprising at least one of the foregoing under conditions that effect the removal, for example for a time effective to dissolve and/or lift the substance; and separating the dissolved and/or lifted material from the substrate. As used herein, "dissolved" includes partial dissolution of a material, often referred to as softening, such that the material can be further removed from the substrate by rinsing or mechanical action.

The cleaning compositions can be used to remove a wide variety of substances, generally those soluble or softenable by organic solvents. Examples include materials such as soils, stains, grease, inks for all types of substrates, including paper, wood, plastic, metal, textiles, ceramics, stone, skin, and for indoor or for outdoor use; adhesives and sealants, for example silicone, polyurethane, epoxy, polyvinyl acetate (including copolymers with ethylene), phenolic, amino resin, cyano acrylate, polyester, polyamide, rubber (styrene-butadiene and natural) or acrylic adhesives and sealants; mastics; photoresists; waxes, for example floor wax or bees wax; asphalts; saps (which as used herein includes pitches, rosins, tars, and natural resins such as tree sap); residual materials left in forms or molds, for example polymers such as alkyds, polyacetals, polyacrylates, polyacrylics, polyamides, polycarbonates, polyesters, polyethers, polyethylenes, polyimides, polystyrenes, polyurethanes, polyvinyls, silicones, natural and synthetic rubbers, and the like, and polymer additives; greases, for example silicone and petroleum-based greases; oils, including machine oil; and paints, finishes, and other coatings, for example, alkyd enamels, acrylic enamels, polyesters, polyurethanes, epoxy resin coatings, latex paints, oil-based paints, shellacs, phenolic coatings, gum varnishes, silicone coatings, polyvinyls, polyvinyl cinnamates, polyamides, polyimides, polyalkyl acrylates, polyalkyl methacrylates, drying oils, polyvinyl acrylates, and cellulosic resins.

The substrates that are treated with the cleaning compositions are reasonably resistant to the cleaning compositions, including natural and synthetic fabrics, wood, cardboard, and coated paper, especially if treated with a wax or other protective material, glass, thermoset resins, thermoplastic resins, ceramic, stone, masonry substrates, cement, or metals (e.g., aluminum alloys, zinc alloys, stainless steel, or galvanized steel).

Although the methods of contacting the surface with the cleaning composition can be accomplished in a number of ways, for example, in aerosol form or other spraying means such as by standard spray nozzles; brush application; dipping; coating; application in gel form such as from a squeeze bottle or brush, and the like. If the surface to be cleaned is readily accessible, then spraying can be used. The spraying pressure will usually be from 1.3 bars to 8.0 bars absolute pressure. The mechanical force of the impinging removal composition facilitates removal of the substance. On the other hand, if the surface to be cleaned has recesses or other shapes that are not readily accessible, immersion can be used. Of course, both methods can be used in combination and/or varied in ways apparent to those skilled in the art. During or after contacting, mechanical action, such as scraping, peeling, rubbing, wiping, and the like can be employed to increase contact and/or aid in dissolution and/or lifting.

The contact time needed to produce an effective degree of dissolution and/or lifting of the substance from a substrate will depend on the nature and thickness of the substance, the composition of the cleaning composition, including the ingredient concentrations, the temperature of the composition, and other factors. With some substances and under some conditions, contact times of a few minutes (e.g., 2-3 minutes) to an hour can be sufficient. Operating temperature when using the removal compositions can be from 0 to 180 degrees centigrade or higher, specifically 15 to 90 degrees centigrade, or 21 to 55 degrees centigrade. The treatment is most conveniently carried out at ambient temperature, but lift time can be shortened as desired by heating the cleaning compositions and/or substrate. Heating can be achieved by local application of heat such as with a heat gun, or more general application of heat, such as with an electric heater, infrared heater, and the like. It is to be understood however, that those skilled in the art can determine optimal conditions for particular removal applications by minimal experimentation. Higher temperatures generally increase the rate at which the substance is removed from the surface.

Specific language is used in the description so as to facilitate the understanding of the principle of the invention. It should, however, be understood that no limitation of the scope of the invention is envisaged by the use of this specific language. Modifications, improvements and perfections may especially be envisaged by a person skilled in the technical field concerned, on the basis of his own general knowledge.

The term "and/or" includes the meanings "and", "or" and also all the other possible combinations of elements connected to this term.

"Synergy" is when the interaction between the components presents in the cleaning compositions improvement of performance, compared with the individual performance of pure components.

By "improve performances", it is understood that the composition according to the invention is able to improve or not significantly reduce solubility of organic or inorganic substances like soil, dirt, oil, grease, polymer, wax, polish, ink, adhesive, mastic, photoresist, sealant, asphalt, sap, paint, varnish, or combinations thereof, on a substrate being a hard surface, such as tiles, metals, concrete, plastic and others, or a soft surface like leather or fabrics made of synthetic or natural fibers.

By "not significantly reduce the performance", it should be understood that the cleaning performance of the composition according to the invention has a reduction of up to 5% measured according to the test described in ASTM D4488-95, that is, it achieves least 95% of the performance of the same composition having in a mass ratio surfactant:ketal of 100:0.

"Surfactants" are compounds that lower the surface tension (or interfacial tension) between two liquids, between a gas and a liquid, or between a liquid and a solid.

EXAMPLES

To perform a comparative performance test, a standard composition of a multi-purpose cleaning agent was used, as shown in Table I below.

TABLE I

Standard composition of a multi-purpose cleaning agent
STANDARD COMPOSITION

| COMPONENTS | % W/W |
|---|---|
| Surfactant or Ketal | 1.00 |
| MEA 99% | 1.00 |
| Water | 98.00 |

A composition prepared according to the present invention was used to compare the results with the Standard Composition. The composition of the present invention is shown in Table II below.

TABLE II

Inventive composition of a multi-purpose cleaning agent
COMPOSITION OF THE PRESENT INVENTION

| COMPONENTS | % W/W |
|---|---|
| Surfactant | X* |
| Ketal | Y* |
| MEA 99% | 1.00 |
| Water | 98.00 |

*X + Y = 1.00

The test for evaluating the cleaning efficacy and the materials for performing the test are described below.

Cleaning Efficacy—Evaluation Method

The cleaning efficacy was evaluated using a method described in standard ASTM D4488-95 "Standard Guide for Testing Cleaning Performance of Products Intended for Use on Resilient Flooring and Washable Walls".

The results of the tests of the inventive combination between surfactant and ketal was compared with the standard composition (in which the mass ratio surfactant:ketal is 100:0). Therefore, the results of the synergic compositions vary according to the standard composition.

Firstly, it was tested the combination of the surfactant alkylpolyglycoside and the ketal 2-isobutyl-2-methyl-1,3-dioxolane-4-methanol in different mass ratios.

The Table III below shows the concentration of the components in the compositions:

TABLE III

Concentrations in % w/w of the combination of APG, 2-isobutyl-2-methyl-1,3-dioxolane-4-methanol, MEA and water

| Product | APG 100 | 80:20 | 60:40 | SOLV 100 |
|---|---|---|---|---|
| APG | 1.00 | 0.80 | 0.60 | — |
| 2-isobutyl-2-methyl-1,3-dioxolane-4-methanol | — | 0.20 | 0.40 | 1.00 |
| MEA 99% | 1.00 | 1.00 | 1.00 | 1.00 |
| Water pH 8 | 98.00 | 98.00 | 98.00 | 98.00 |

FIG. 1 shows the results of the tests. It is possible to notice that the combination of APG and 2-isobutyl-2-methyl-1,3-dioxolane-4-methanol at mass ratio between 80:20 and 60:40 provided a synergistic cleaning effect as the performance of the composition of the present invention has been improved compared with the individual performance of APG and the solvent.

In the second test carried out, the surfactant used was amine oxide (AO) and the ketal was 2-isobutyl-2-methyl-1,3-dioxolane-4-methanol.

The Table IV shows the concentration of the components in the composition in different mass ratios.

TABLE IV

Concentrations in % w/w of the combination of AO, 2-isobutyl-2-methyl-1,3-dioxolane-4-methanol, MEA and water

| Product | APG 100 | 80:20 | 60:40 | SOLV 100 |
|---|---|---|---|---|
| AO | 1.00 | 0.80 | 0.60 | — |
| 2-isobutyl-2-methyl-1,3-dioxolane-4-methanol | — | 0.20 | 0.40 | 1.00 |
| MEA 99% | 1.00 | 1.00 | 1.00 | 1.00 |
| Water pH 8 | 98.00 | 98.00 | 98.00 | 98.00 |

The same test was carried out with the ketal 2,2-dimethyl-1,3-dioxolane-4-methanol.

Table V shows the concentration of the components in the composition in different mass ratios:

TABLE V

Concentrations in % w/w of the combination of AO, 2,2-dimethyl-1,3-dioxolane-4-methanol, MEA and water

| Product | APG 100 | 80:20 | 60:40 | SOLV 100 |
|---|---|---|---|---|
| AO | 1.00 | 0.80 | 0.60 | — |
| 2,2-dimethyl-1,3-dioxolane-4-methanol | — | 0.20 | 0.40 | 1.00 |
| MEA 99% | 1.00 | 1.00 | 1.00 | 1.00 |
| Water pH 8 | 98.00 | 98.00 | 98.00 | 98.00 |

Figure 2:
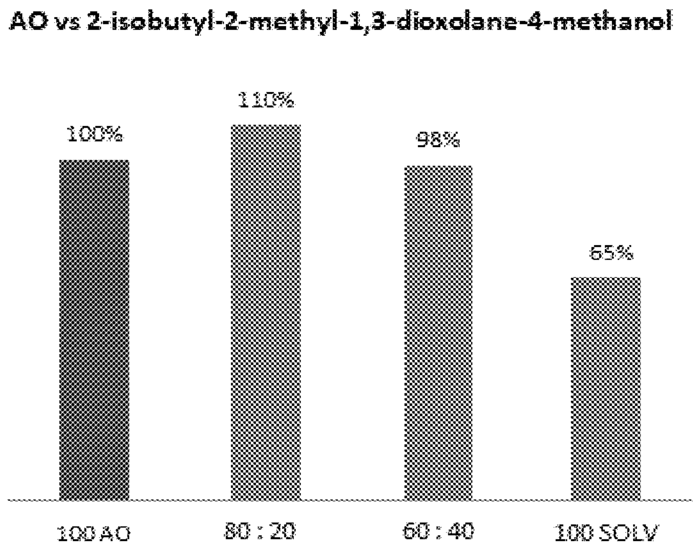
FIG. 2 shows the result of the test performed for amine oxide and 2-isobutyl-2-methyl-1,3-dioxolane-4-methanol.
Figure 3:
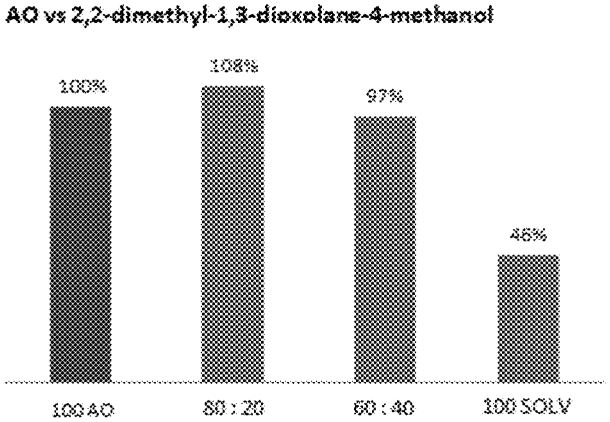
FIG. 3 shows the result of the test performed for amine oxide and 2,2-dimethyl-1,3-dioxolane-4-methanol.

It is verified in FIGS. 2 and 3 the synergism between the surfactant AO and the ketals 2-isobutyl-2-methyl-1,3-dioxolane-4-methanol and 2,2-dimethyl-1,3-dioxolane-4-methanol at mass ratios 80:20 and 60:40. It is important to note that even though the result of the performance of the composition of both ketals tested at the mass ratio of 60:40 was a little lower than the standard composition, the expectation based on the prior art was to have a higher reduction in the performance when replacing part of the surfactant by the ketals. Thus, it is considered that the reduction of up to 5% would mean that the synergism between the components is still present.

In another test carried out, the surfactant used was dodecylbenzenesulfonate (SDBS) and the ketal was 2-isobutyl-2-methyl-1,3-dioxolane-4-methanol.

Table VI shows the concentration of the components in the compositions:

TABLE VI

Concentrations in % w/w of the combination of SDBS, 2-isobutyl-2-methyl-1,3-dioxolane-4-methanol, MEA and water

| Product | AO 100 | 80:20 | 60:40 | 40:60 | 20:80 | SOLV 100 |
|---|---|---|---|---|---|---|
| SDBS | 1.00 | 0.80 | 0.60 | 0.40 | 0.20 | — |
| 2-isobutyl-2-methyl-1,3-dioxolane-4-methanol | — | 0.20 | 0.40 | 0.60 | 0.80 | 1.00 |
| MEA 99% | 1.00 | 1.00 | 1.00 | 1.00 | 1.00 | 1.00 |
| Water pH 8 | 98.00 | 98.00 | 98.00 | 98.00 | 98.00 | 98.00 |

Figure 4:
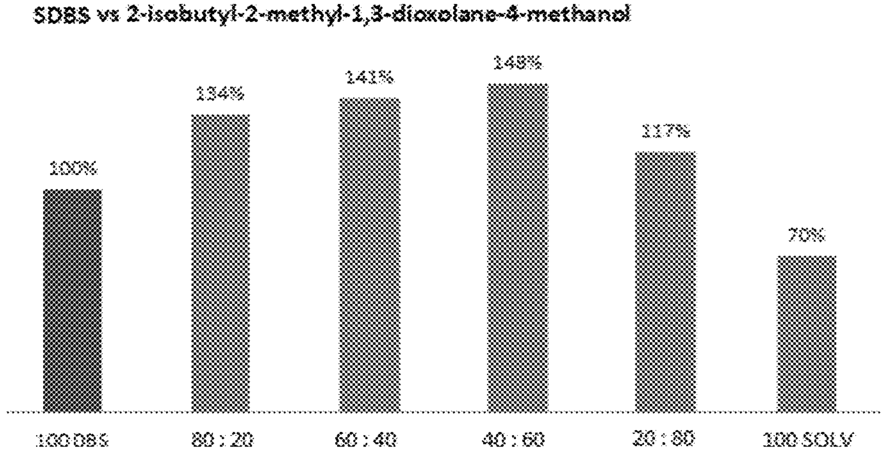
FIG. 4 shows the result of the test performed for dodecylbenzenesulfonate and 2-isobutyl-2-methyl-1,3-dioxolane-4-methanol.

FIG. 4 shows the results of the tests according to Standard ASTM D4488-95. As can be seen, the combination of SDBS and 2-isobutyl-2-methyl-1,3-dioxolane-4-methanol showed a great synergism effect, specially at mass ratios 60:40 and 40:60, in which the cleaning performance was more than 40% higher when compared to the standard composition.

In another test carried out, the surfactant used was alcohol ethoxylate 7EO and the ketal was 2-isobutyl-2-methyl-1,3-dioxolane-4-methanol.

Table VII shows the concentration of the components in the compositions:

TABLE VII

Concentrations in % w/w of the combination of alcohol ethoxylate 7EO, 2-isobutyl-2-methyl-1,3-dioxolane-4-methanol, MEA and water

| Product | 7EO 100 | 80:20 | 60:40 | 40:60 | SOLV 100 |
|---|---|---|---|---|---|
| Alcohol ethoxylate 7EO | 1.00 | 0.80 | 0.60 | 0.40 | — |
| 2-isobutyl-2-methyl-1,3-dioxolane-4-methanol | — | 0.20 | 0.40 | 0.60 | 1.00 |
| MEA 99% | 1.00 | 1.00 | 1.00 | 1.00 | 1.00 |
| Water pH 8 | 98.00 | 98.00 | 98.00 | 98.00 | 98.00 |

The same surfactant, namely, alcohol ethoxylate 7EO was used in combination to the ketal 2,2-dimethyl-1,3-dioxolane-4-methanol for testing the cleaning performance.

Table VIII shows the concentration of the components in the compositions:

TABLE VIII

Concentrations in % w/w of the combination of alcohol ethoxylate 7EO, 2,2-dimethyl-1,3-dioxolane-4-methanol, MEA and water

| Product | 7EO 100 | 80:20 | SOLV 100 |
|---|---|---|---|
| Alcohol ethoxylate 7EO | 1.00 | 0.80 | — |
| 2,2-dimethyl-1,3-dioxolane-4-methanol | — | 0.20 | 1.00 |
| MEA 99% | 1.00 | 1.00 | 1.00 |
| Water pH 8 | 98.00 | 98.00 | 98.00 |

Figure 5:
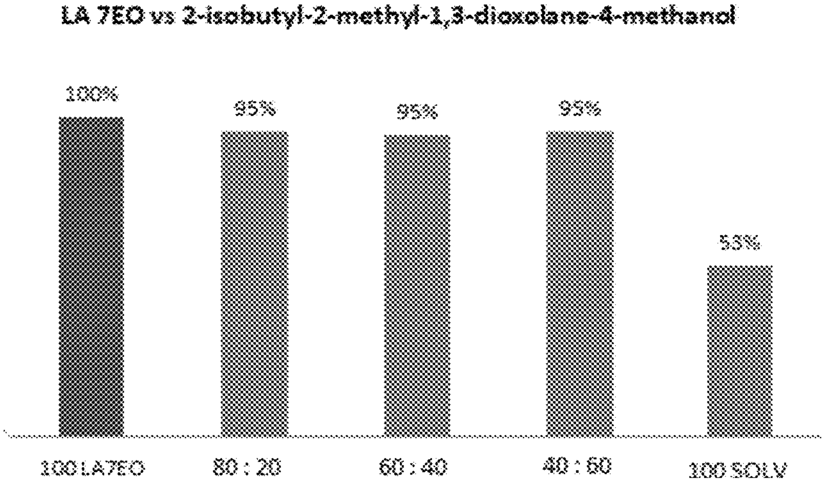
FIG. 5 shows the result of the test performed for alcohol ethoxylate 7EO and 2-isobutyl-2-methyl-1,3-dioxolane-4-methanol.
Figure 6:
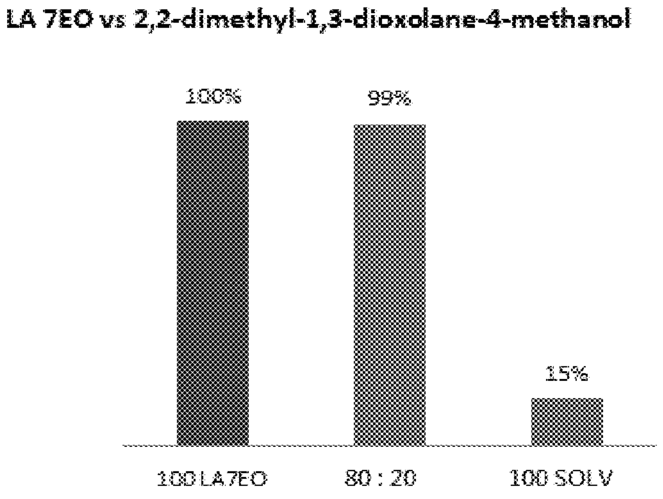
FIG. 6 shows the result of the test performed for alcohol ethoxylate 7EO and 2,2-dimethyl-1,3-dioxolane-4-methanol.

FIGS. 5 and 6 show the result of the tests, in which the cleaning performance of the inventive compositions was reduced in up to 5% compared to the standard composition. As disclosed above, a skilled person would expect to have a higher reduction in the performance when increasing the concentration of the ketal and decreasing the concentration of the surfactant. However, since the reduction was of 5% at most, it is considered that the composition still shows synergism between the components.

Finally, a final test was carried out, in which the surfactant used was alcohol ethoxylate 9EO and the ketal was 2-isobutyl-2-methyl-1,3-dioxolane-4-methanol.

Table IX shows the concentration of the components in the compositions:

TABLE IX

Concentrations in % w/w of the combination of alcohol ethoxylate 9EO, 2-isobutyl-2-methyl-1,3-dioxolane-4-methanol, MEA and water

| Product | 9EO 100 | 80:20 | 60:40 | 40:60 | SOLV 100 |
|---|---|---|---|---|---|
| Alcohol ethoxylate 9EO | 1.00 | 0.80 | 0.60 | 0.40 | — |
| 2-isobutyl-2-methyl-1,3-dioxolane-4-methanol | — | 0.20 | 0.40 | 0.60 | 1.00 |
| MEA 99% | 1.00 | 1.00 | 1.00 | 1.00 | 1.00 |
| Water pH 8 | 98.00 | 98.00 | 98.00 | 98.00 | 98.00 |

Figure 7:
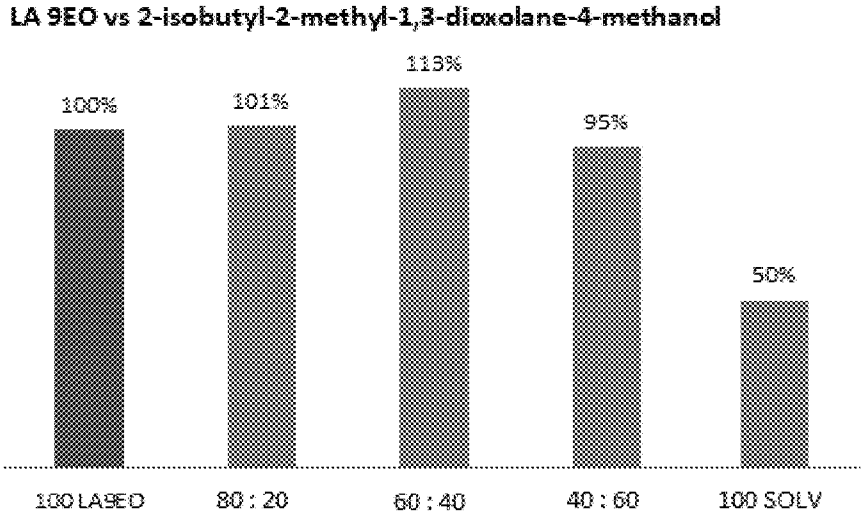
FIG. 7 shows the result of the test performed for alcohol ethoxylate 9EO and 2-isobutyl-2-methyl-1,3-dioxolane-4-methanol.

FIG. 7 shows the result of the test, in which the cleaning performance of the inventive compositions had higher results in the mass ratios of 80:20 and 60:20 and was reduced in 5% when compared to the standard composition. Therefore, the combination of alcohol ethoxylate 9EO and 2-isobutyl-2-methyl-1,3-dioxolane-4-methanol is also synergic when used for preparing cleaning compositions.

Therefore, surprisingly, it has been found that the use of the above claimed composition allows a boost on the cleaning performance compared to pure surfactant and/or ketals-based cleaning compositions.

The invention claimed is:

1. A composition for cleaning application comprising:

water;

an alkalinizing agent;

at least one surfactant;

at least one ketal of formula (I):

(I)

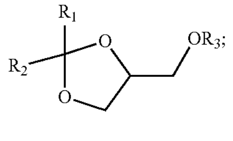

wherein $R_1$ and $R_2$, independently from one another, are selected from the group consisting of: a linear or branched $C_1$-$C_{12}$ alkyl group, $R_3$ is H; and wherein:

the surfactant is chosen from alkylbenzenesulfonates, the mass ratio between the surfactant and the ketal is between 60:40 to 40:60, and the composition comprises 1% by weight of the combination of surfactant and ketal of formula I.

2. The composition according to claim 1, wherein $R_1$ is $CH_3$.

3. The composition according to claim 1, wherein $R_2$ is $CH_3$ or isobutyl.

4. The composition according to claim 1, wherein $R_2$ is 2-isobutyl-2-methyl-1,3-dioxolane-4-methanol.

5. The composition according to claim 1, wherein the surfactant is selected from water-soluble salts of alkylbenzenesulfonates.

6. The composition according to claim 5, wherein the surfactant is sodium dodecylbenzenesulfonate (SDBS).

7. The composition according to claim 1, wherein the alkalinizing agent is selected from the group consisting of monoethanolamine (MEA), potassium hydroxide, sodium hydroxide, triethanolamine (TEA) and methyl isopropylamine (MIPA).

8. The composition according to claim 7, 0.5 to 2% by weight of alkalinizing agent and 96 to 99% by weight of water.

9. The composition according to claim 7, comprising 1% by weight of alkalinizing agent and 98% by weight of water.

10. A method, comprising: cleaning a hard surface with the composition defined in claim 1.

11. The method of claim 10, wherein the surfactant is sodium dodecylbenzenesulfonate (SDBS).

12. The method of claim 10, wherein the cleaning improves the cleaning performance measured by the standard ASTM D4488-95 compared to a composition having a mass ratio surfactant:ketal of formula I of 100:0.

13. The method according to claim 12, wherein the improvement in the performance means an increase of the cleaning performance or a performance of at least 95% of the performance of the same composition having a mass ratio surfactant:ketal of formula I of 100:0.

* * * * *